United States Patent [19]

Itako et al.

[11] Patent Number: 5,409,092

[45] Date of Patent: Apr. 25, 1995

[54] VENDING SYSTEM CAPABLE OF RENEWING RECORD OF A PREPAID CARD

[75] Inventors: Eiji Itako; Masanori Tanaka, both of Sakado, Japan

[73] Assignee: Nippon Conlux Co., Ltd., Japan

[21] Appl. No.: 702,889

[22] Filed: May 20, 1991

[30] Foreign Application Priority Data

May 25, 1990 [JP] Japan .................................. 2-133983

[51] Int. Cl.⁶ ............................................. G07F 7/08
[52] U.S. Cl. .................................. 194/210; 235/381; 194/217
[58] Field of Search ............... 194/205, 206, 210, 215, 194/216, 217, 218; 235/381

[56] References Cited

U.S. PATENT DOCUMENTS

| | | | |
|---|---|---|---|
| 3,560,715 | 2/1971 | Akamatsu | 194/210 X |
| 3,653,480 | 4/1972 | Yamamoto et al. | 194/210 |
| 3,958,103 | 5/1976 | Oka et al. | 194/210 X |
| 4,085,313 | 4/1978 | Van Ness | 235/381 |
| 4,669,596 | 6/1987 | Capers et al. | 194/210 |
| 4,677,565 | 6/1987 | Ogaki et al. | 194/217 X |
| 4,809,837 | 3/1989 | Hayashi | 194/210 X |
| 4,896,024 | 1/1990 | Morello et al. | 194/210 X |
| 4,907,250 | 3/1990 | Ricks | 235/381 X |
| 5,042,686 | 8/1991 | Stucki | 194/217 X |

FOREIGN PATENT DOCUMENTS

| | | | |
|---|---|---|---|
| 3620755 | 12/1987 | Germany | 235/381 |
| 52-28396 | 3/1977 | Japan . | |
| 54-20367 | 7/1979 | Japan . | |
| 55-52191 | 4/1980 | Japan . | |
| 59-117692 | 7/1984 | Japan . | |
| 62-24393 | 2/1987 | Japan . | |
| 113392 | 4/1990 | Japan | 235/381 |

*Primary Examiner*—Michael S. Huppert
*Assistant Examiner*—Scott L. Lowe
*Attorney, Agent, or Firm*—Graham & James

[57] ABSTRACT

In a vending machine for which both money and a prepaid card can be used, a writing-instruction switch is provided for controlling of amount information into the card. When the writing-instruction switch has been actuated, the amount of inserted money and the credited value of the card are added up and the sum is written into the card for renewing its credited value. In this manner, it becomes possible to additionally renew the amount recorded in the prepaid card. Further, an amount selector may be provided for selecting an amount to be added to a prepaid card. On condition that money of an amount not smaller than the amount selected by the amount selector has been inserted, the selected amount and the recorded amount of the card are added up for renewing the recorded amount of the card. Thus, it becomes possible to write a desired amount into an already issued prepaid card.

6 Claims, 6 Drawing Sheets

VENDING SYSTEM CAPABLE OF RENEWING RECORD OF A PREPAID CARD

BACKGROUND OF THE INVENTION

This invention relates to a system which can be used in an automatic vending machine or other devices related thereto, and more particularly, to such system capable of renewing amount record in a prepaid card.

In a prepaid card, namely, a prepaid purchase card, money amount information is recorded by means of magnetic or other suitable recording methods.

There are generally two types of prepaid cards in reruns of their usages. With one type of the cards, an amount spent is merely subtracted from the amount recorded in the card until its balance becomes zero at which time the card is prohibited from further use. With the other type, additional or cumulative renewal of a recorded amount is enabled so that the card can be used permanently or recycled. Further, with the other type, a cash amount can be entered into the card by the use of a dedicated cash amount recording machine, or by the use of an automatic vending machine for which both money and a card can be used.

The entering of a cash amount into a card by the use of an automatic vending machine for which both money and a card can be used is disclosed, for example, in Japanese Patent Laid-open Publication No. 52-28396, 55-52191 or 59-117692, or Japanese Patent Publication No. 54-20367. Each of the above-listed publications shows the feature that amounts of inserted card and money are added together, a product sale is permitted only within the range of the sum of the card and money amounts, and the amount of change is written into the inserted card instead of being returned in cash.

Also, Japanese Patent Laid-open Publication No. 62-24393 shows the feature that the amount of change is written into a card instead of being returned in cash when a sale has been made, whereas the sum of the amounts of inserted card and money is written into the card in response to the actuation of a card returning button when no sale has been made.

However, when the amount recorded in a prepaid card is to be additionally renewed in the prior art prepaid card systems, it is not at all possible to receive the change in cash even if so desired, for the reason that the total amount of the change is, as mentioned, automatically written into the card when a sale has been made by the combined payment of a card and cash. This undesirably causes inconveniences to the purchaser or user when he wants the change to be given back in cash.

Also, according to the prior art prepaid card systems, the entire amount of the change is additionally written, and it is impossible to additionally write only a desired amount into the card.

Furthermore, automatic vending machines which sell various prepaid card, such as a telephone card vending machine are also known. However, each of the known machines of this type only issues a new prepaid card in response to the required payment and it can not additionally renew the amount recorded in an already issued prepaid card.

SUMMARY OF THE INVENTION

It is therefore an object of the present invention to provide a vending system which enables an amount recorded in a prepaid card to be additionally renewed freely as desired by a user, irrespective of whether or not a sale has been made.

It is another object of the present invention to provide a prepaid card vending system which can renew an amount recorded in an already issued prepaid card in addition to selling a new prepaid card.

It is still another object of the present invention to provide a vending system which enables a desired amount to be selectively recorded in an already issued prepaid card.

A vending system according to the first aspect of the present invention comprises a money identifying section for identifying an inserted money, a card receiving section for receiving a card in which amount information is recorded, a card amount reading section for reading the amount information recorded in the card that is received by said card receiving section, a money amount calculating section for counting an amount of the inserted money based on an output of said money identifying section and obtaining a balance of the inserted money by subtracting an amount corresponding to a selling price of a product, a card amount calculating section for inputting the amount read by the card amount reading section and obtaining a balance of the card amount by subtracting the input amount an amount corresponding to a selling price of a product, writing-instruction means for instructing for writing of amount information into the card, a product sale selecting section for selecting a sale of a product, a selling section for performing a selling action for a product when the product has been selected by said product sale selecting section, a subtraction controlling section for, when the selling action has been performed, controlling said money amount calculating section and said card amount calculating section in such a manner that an amount equivalent to a selling price of a sold product is subtracted in at least one of said calculating sections, a first write-controlling section for, when subtraction has been performed in said card amount calculating section under a control of said subtraction controlling section, writing a balance thereof into the card received by said card receiving section, and a second write-controlling section for, in response to instruction of said writing-instruction means, writing a sum of outputs of said money amount calculating section and said card amount calculating section into the card received by said card receiving section and then automatically returning the card.

The vending system according to the first aspect of the present invention as mentioned above is concerned with automatic vending machines in general for which money and a card can be used in combination.

When money has been inserted, the money is first identified by the identifying section, and an amount of the inserted money is counted by the money amount calculating section based on the identification results. When, on the other hand, a card has been inserted, the card is received by the receiving section, and amount information recorded in the card is read by the card amount calculating section to be input to the card amount calculating section. Before a sale is made, the output of the money amount calculating section indicates the amount of the inserted money, and the output of the card amount calculating section indicates the current amount of the inserted card.

When a product has been selected by means of the product sale selecting section, a sale is permitted within the range of the sum of the amount of the inserted money and the current amount of the card as is conventionally known, and a product selling action is performed by the selling section. When a sale has been made, the amount equivalent to the selling price of the sold product is subtracted in at least one of the money amount calculating section and card amount calculating section under the control of the subtraction controlling section. The control in this case may be made in any suitable manner. For example, the selling price may be subtracted first or preferentially from one of the cash and card amounts and then the balance due, if any, may be subtracted from the other of the amounts; or the selling price may be divided into two at a suitable ratio so that respective amounts are subtracted from the cash and card amounts in accordance with the ratio. As the result of the subtraction, respective necessary subtractions are made in the money amount calculating section and the card amount calculating section, so that the output of the money amount calculating section becomes indicative of the balance of the inserted money amount and the output of the card amount calculating section becomes indicative of the balance of the card amount.

When subtraction of the necessary amount has been made in response to the selling action in the card amount calculating section under the above mentioned control of the subtraction controlling section, the first write-controlling section writes the balance of the card amount as indicated by the output of the card amount calculating section into the card received by the card receiving section, namely, into the inserted card. Thus, the amount recorded in the card is caused to decrease in correspondence to the amount spent on the product. It is to be noted that the balance of the inserted money amount, namely, the change is not written into the card at this time. Therefore, the change can be returned in cash through a conventionally known method. For example, with an automatic vending machine that is capable of selling only a single product for each insertion of money or a card (single product-vending type), the balance of the inserted money amount indicated by the output of the money amount calculating section may be automatically returned as the change immediately after one selling action. On the other hand, with another automatic vending machine that is capable of selling plural products in succession for each insertion of money or a card (plural-product vending type), the balance of the inserted money amount indicated by the output of the money amount calculating section may be returned as the change in response to the actuation of a return switch after one or more selling actions. In either cases, the card being received by the card receiving section may be automatically returned at the same time as the change is returned.

When it is desired to have the inserted money amount written into the card, the writing-instruction means, e.g. a switch, is caused to operate, in response to which the second write-controlling section is caused to write the sum of the outputs of the money and card amount calculating sections into the card received by the card receiving section. The card is then automatically returned. In this manner, the amount recorded in the prepaid card can be additionally or cumulatively renewed. The operation of the writing-instruction means may take place before the selling action, or alternatively, it may take place after the selling action when it is not requested to return the change in cash. If the operation of the writing-instruction means takes place before the selling action, the entire inserted money amount can be additionally recorded in the prepaid card. If, on the other hand, the actuation takes place after the selling action, the amount equivalent to the change can be additionally recorded into the prepaid card. It is a matter of course that the amount equivalent to the change can be returned in cash instead of being additionally recorded into the prepaid card, in such a case where the change is automatically returned in cash or it is requested to return the change in cash.

prepaid card vending system according to the second aspect of the present invention which includes a money device for identifying inserted money and calculating an amount of the inserted money, a sale selecting section for selecting a sale of a card in which amount information is recorded, a selling section for performing a selling action for the card selected by said sale selecting section, and a subtraction controlling section for, when the selling action has been performed, effecting such control as to subtract a selling price of a sold card from the amount of the inserted money calculated by said money device, and the prepaid card vending system comprises a card receiving section for receiving a card in which amount information is recorded, a card amount reading section for reading the amount information in the card received by said card receiving section, writing-instruction means for instructing for writing of amount information into the card, and a card amount writing section for, in response to instruction of said writing-instruction means, writing a sum of the amount of the inserted money calculated by said money device and an amount read by said card amount reading section into the card and then returning the card.

The prepaid card vending system according to the second aspect is concerned with a prepaid card vending machine.

This prepaid card vending system can not only sell a prepaid card but also receive a card by means of the card receiving section. When it is desired to increase the amount recorded on an already issued card, both money and the card are inserted, and the writing-instruction means is caused to operate. The amount information recorded on the inserted card is read by the card amount reading section, and the sum of the thus read card amount and the inserted money amount is written into the card in response to the operation of the writing-instruction means, the card being subsequently returned. In this manner, conveniently, the prepaid card system can sell a new prepaid card but also can additionally renew the amount on an already issued prepaid card in a prepaid card vending system.

A vending card system according to the third aspect of the present invention comprises a money device for identifying inserted money and calculating an amount of the inserted money, a card receiving section for receiving a card on which amount information is recorded, a card amount reading section for reading the amount information recorded in the card received by said card receiving section, an amount selecting section for selecting an amount to be added to a card, writing-instruction means for instructing for writing of amount information into the card, a card amount writing section for, in response to instruction of said writing-instruction means, writing a sum of the amount selected by said amount selecting section and the amount read by said card amount reading section and then returning the card, and a controlling section for effecting such control as to subtract the amount selected by said amount selecting section from the amount calculated by said money device to return the balance as the change.

The vending system according to the third aspect is concerned with automatic vending machines in general for which money and a prepaid card can be used in combination and also with a prepaid card vending machine. With this system, the amount to be added to a prepaid card can be selected as desired by means of the amount selecting section. In response to instruction of the writing-instruction means, the sum of the amount recorded in the card and the amount selected by the amount selecting section is written into the card. Then, the card is returned, and also the difference between the inserted money amount and the amount selected by the amount selecting section is returned as the change. In this manner, a desired amount can be freely selected and then can be additionally written into an already issued prepaid card.

Preferred embodiments of the invention will now be described with reference to the accompanying drawings.

BRIEF DESCRIPTION OF THE DRAWINGS

In the accompanying drawings.

DETAILED DESCRIPTION OF THE PREFERRED EMBODIMENTS

Figure 1:
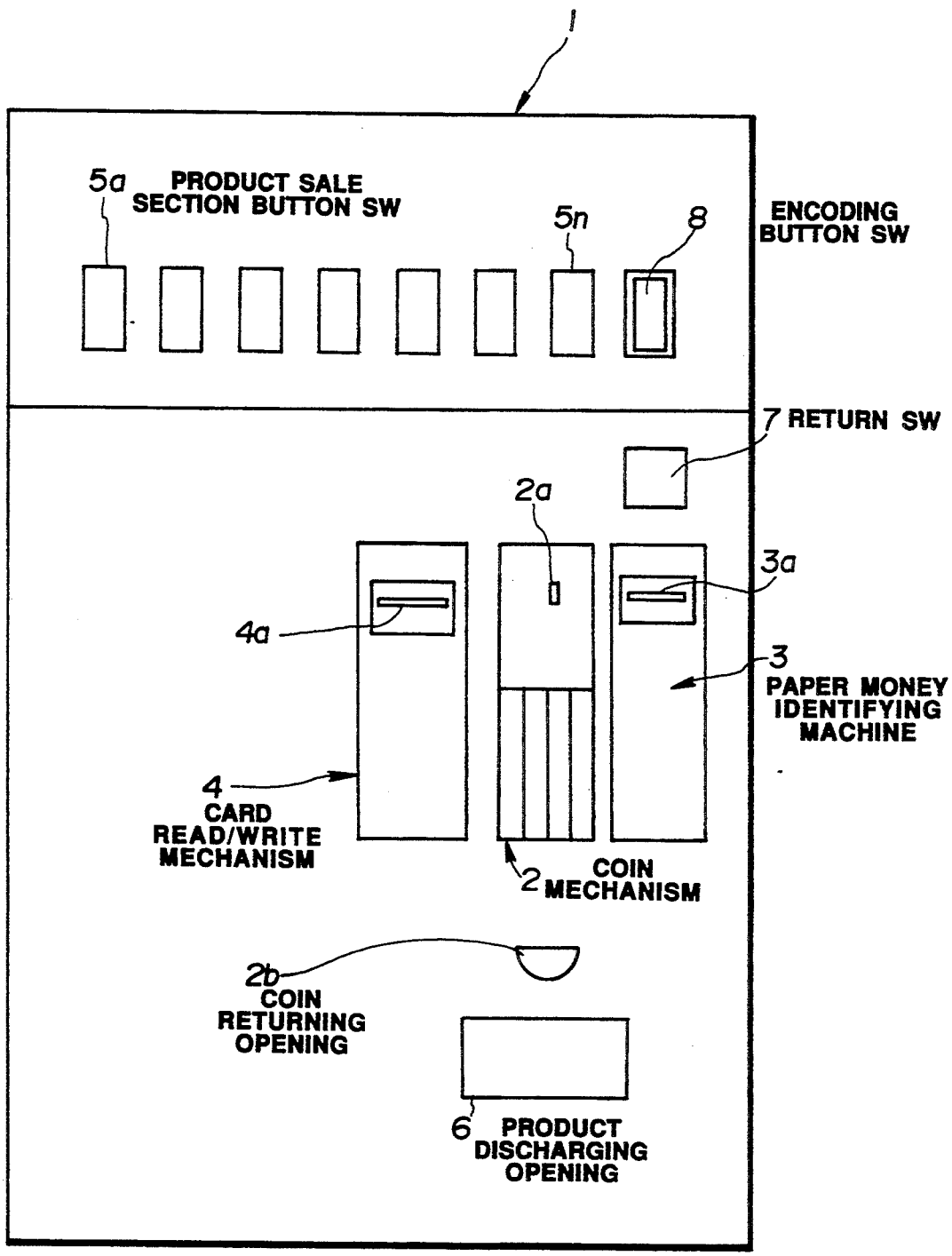
FIG. 1 is a front elevational view showing an embodiment of the present invention used in an automatic vending machine for which both money and a prepaid card can be used in combination.

FIG. 1 shows an example of the present invention as embodied in a conventionally-known automatic vending machine for which both money and a prepaid card can be used, the automatic vending machine being shown here in front elevation.

A coin mechanism 2, a paper money identifying machine 3 and a card read/write mechanism 4 are provided at respective suitable locations in the main body of the automatic vending machine 1. In the figure, 2a denotes a coin inserting slot of the coin mechanism 2, 3a a paper money inserting slot of the paper money identifying machine 3, and 4a a card inserting slot of the card read/write mechanism 4. 5a-5n denote product sale selection button switches, and 6 denotes a product discharging opening. 7 denotes a return switch that is actuated to have inserted money or change returned. Further, 2b denotes a coin returning opening.

The coin mechanism 2 may be the one having such known functions as determining the genuineness of the coin (i.e., whether the coin is true or false) introduced through the coin inserting slot 2a, counting the amount of the inserted coin etc. Likewise, the paper money identifying machine 3 may be the one having such known functions as determining the genuineness of the paper money (i.e., whether the paper money is true or false) introduced through the paper money inserting slot 3a, counting the amount of the introduced paper money etc. The card read/write mechanism 4 serves to read amount information in a prepaid card inserted through the card inserting slot 4a and to write amount information etc. into the card. The prepaid card to be processed by the embodiment may be of a magnetic type, an IC (integrated circuit) type, or any other types.

The encoding button switch 8 is provided for selecting writing of amount information into the card.

Figure 2:
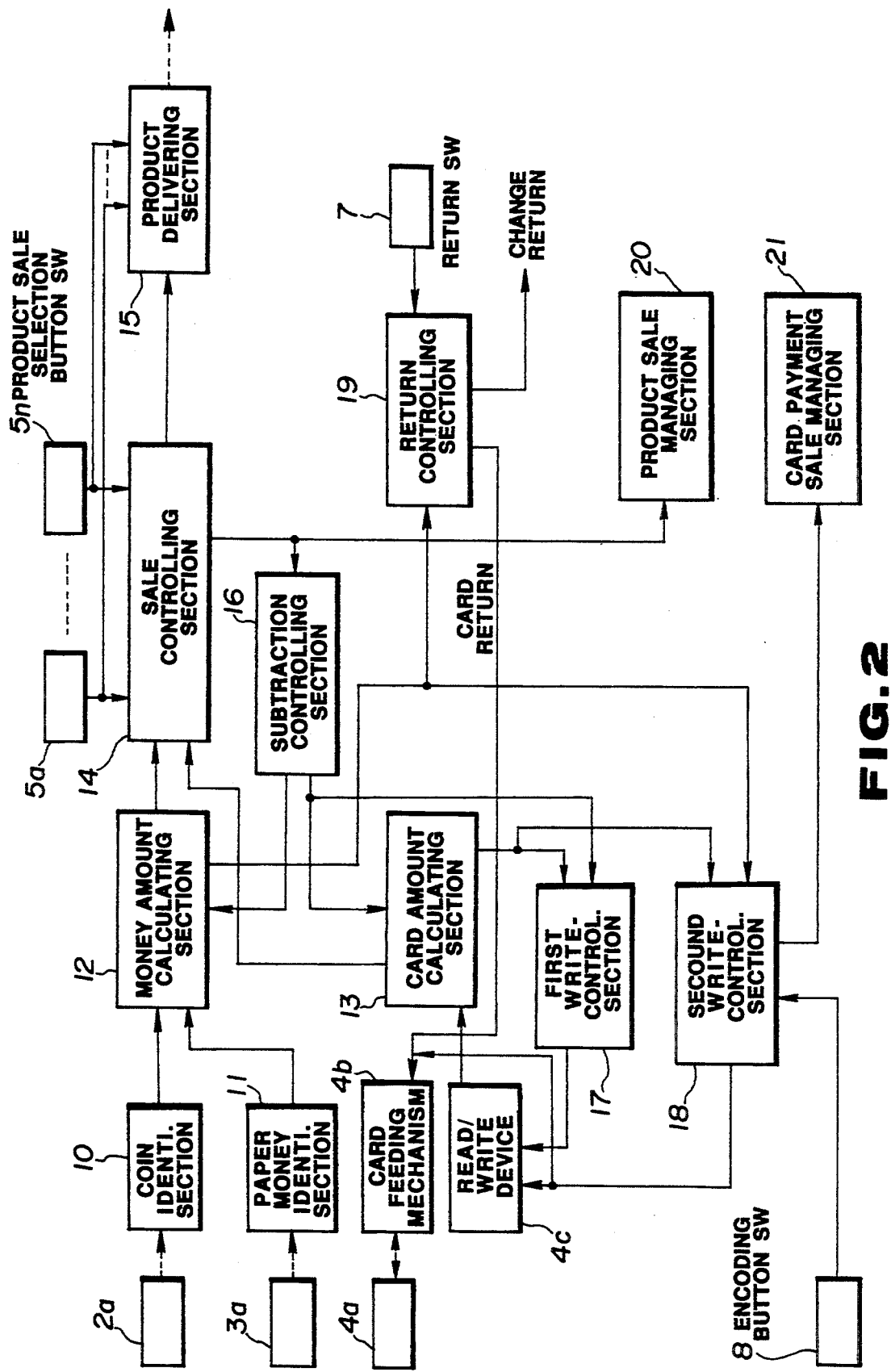
FIG. 2 is a block diagram schematically showing an example of a control-circuit section of the vending machine of FIG. 1.

FIG. 2 is a block diagram schematically showing a control-circuit section of the automatic vending machine shown in FIG. 1.

Referring to FIG. 2, the genuineness of a coin introduced through the coin inserting slot 2a is determined by a coin identifying section 10, while the genuineness of a paper money introduced through the paper money inserting slot 3a is determined by a paper money identifying section 11. An amount calculating section 12 serves to add up the amount of introduced money based on the outputs of the identifying sections 10, 11 or to subtract an amount corresponding to the selling price of a product so that the balance of the inserted money can be obtained.

A prepaid card inserted from the card inserting slot 4a is introduced by a card feeding mechanism 4b inside the card read/Write mechanism 4, during which time identification information, amount information etc. recorded in the card is read by a read/write device 4c. As is well known, the card is immediately returned if it is not an acceptable card, but it is retained in the feeding mechanism 4b if it is an acceptable card.

A card amount calculating section 13 inputs and temporarily stores amount information of the card as read by the read/write device 4c. The card calculating section 13 also subtracts from the stored amount an amount corresponding to the selling price so that the balance of the card amount can be obtained.

A sale controlling section 14 adds up the inserted money amount and the card amount based on the outputs of the calculating sections 12, 13, and it determines whether a sale of a product selected through the actuation of any of the product selection button switches 5a-5n is permissible or not. If the sale of the selected product has been determined as permissible, the control section 14 controls a product delivering section 15 to initiate a necessary action for selling the selected product.

When the selling action has been done, a subtraction controlling section 16 controls the money amount calculating section 12 and the card amount calculating section 13 in such a manner that an amount equivalent to the selling price of the sold product is subtracted in at least one of the calculating sections 12, 13. Such control may be made in any suitable manner. For example, the selling price may be subtracted first or preferentially from one of the cash amount and the card amount and then the balance due, if any, may be subtracted from the other; or alternatively, the selling price may be divided into two at a suitable division ratio so that respective amounts may be subtracted from both of the cash and card amount in accordance with the division ratio. As the result of the subtraction, respective necessary amounts are subtracted in the money amount calculating section 12 and the card amount calculating section 13, so that the output of the money amount calculating section 12 becomes indicative of the balance of the inserted money and the output of the card amount calculating section 13 becomes indicative of the balance of the card amount.

When the selling action has been performed, and hence subtraction has been performed in the card amount calculating section 13 under the control of the subtraction controlling section 16, a first write-controlling section 17 controls the read/write device 4c for writing the balance of the card amount indicated by the output of the card amount calculating section 13 into the card that is being retained by the card feeding mechanism 4b. Thus, the amount recorded in the card is caused to decrease in correspondence to the amount spent for the product. As described, when a sale has been made, only the balance of the card amount is written into the card, but the balance of the inserted money amount, namely, the amount equivalent to the change is not additionally written in automatic manner. Therefore, the balance of the inserted money amount indicated by the output of the memory amount calculating section 12 can be returned as the change in cash.

The return of the change in cash may be made through a conventionally known method. For example, in a case where only a single product for each insertion of money or a card is sold, the balance of the inserted money amount indicated by the output of the money amount calculating section 12 may be automatically returned as the change immediately after one selling action. On the other hand, in another case where plural products are sold in succession for each insertion of money or a card, the balance of the inserted money amount indicated by the output of the money amount calculating section 12 may be returned as the change in response to the actuation of the return switch 7 after one or more selling actions. In either of the cases, the card that is being retained by the card feeding mechanism 4b may be automatically returned at the same time as the change is returned.

When the return switch 7 has been actuated, the inserted money is returned, or the change, if any, is returned in cash. That is to say, in response to the actuation of the return switch 7, a return controlling section 19 performs such control as for returning the balance of the inserted money amount indicated by the money amount calculating section 12 as the change in cash and also for automatically returning the card that is being retained by the card feeding mechanism 4b.

The writing of the inserted money amount into the card is performed by a second write-controlling section 18 only when the encoding button switch 8 has been actuated. When the encoding button switch 8 has been actuated, the second write-controlling section 18 performs controls for writing the sum of the outputs of the money amount calculating section 12 and the card amount calculating section 13 into the card being retained by the card feeding mechanism 4b and then automatically returning the card.

Therefore, when it is desired to additionally renew the amount of an already issued card, the card is inserted along with money of the amount to be added, and the encoding button switch 8 is actuated. Thus, the sum of the current amount on the card and the inserted money amount is obtained from the outputs of the calculating sections 12, 13, so that the sum is written into the card under the control of the second write-controlling section 18.

On the other hand, when it is desired to cancel a purchase after both a prepaid card and money have been inserted, the return switch 7 is actuated. In this case, the card is directly returned without its amount being changed, and also the inserted money amount is directly returned in cash. Accordingly, it becomes possible to forestall the inconveniences that the card amount is additionally renewed automatically although such additional renewal is not intended.

When any of the product sale selection button switches 5a–5n has been selectively actuated without the encoding button switch 8 being actuated after the insertion of a prepaid card and money of an amount to be added to the card, a product selling action is performed in correspondence to the total amount of the inserted card and money. As described, in the case of a single product vending, the card is automatically returned after an amount for the product sale has been subtracted therefrom. If there is any change of an amount corresponding to the inserted money amount, such change amount is not added to the card amount but returned in cash. On the other hand, in the case of successive product vending, when the return switch 7 has been operated, the card is automatically returned in response to the actuation of the return switch 7 after an amount for the product sale has been subtracted therefrom, and also the change corresponding to the inserted money amount is returned in cash. Therefore, when the return switch 7 has been actuated without the encoding button switch 8 being actuated, the change amount corresponding to the inserted money amount is prevented from being added to the card amount. On the other hand, in the case of the successive product vending, when the encoding button switch 8 has been actuated prior to the actuation of the return switch 7, the sum of the inserted money amount and the card amount is obtained by means of the second controlling section 18 based on the outputs of the calculating sections 12, 13, and then the obtained sum is written into the card. Thus, the change amount corresponding to the inserted money amount is combined into the card amount so that the card amount is additionally renewed without the change being returned in cash.

As a modification, the actuation of the encoding button switch 8 may be made effective only before the selling action is performed and it may be made ineffective once the selling action has been performed. In such a case, the change amount is prevented from being combined into the card amount for additional renewal thereof.

When all or a portion of the inserted money amount is combined into the card amount, other processes than normal sales management may be done. A product sale managing section 20 serves to cumulatively record sales of the products that have been sold in correspondence to the selection of the product sale selection button switches 5a–5n, and it may be a conventionally known product sale managing section. A card payment sale managing section 21 manages such sales that results when all or a portion of the inserted money amount has been combined into the card amount. In this card payment sale managing section 21, data related to the contents written into the card by the second write-controlling section 18 is recorded. The recording may be done in any suitable manner. Most simply, the output of the money amount calculating section 12 may be recorded as card payment sale data. This means that that portion of the inserted money amount which has been combined into the card amount and recorded in the card is cumulatively recorded in the card payment sale managing section 21. The cumulative recording may be done by recording the individual amount for each sale, or by accumulating the respective amounts one by one.

Figure 3:
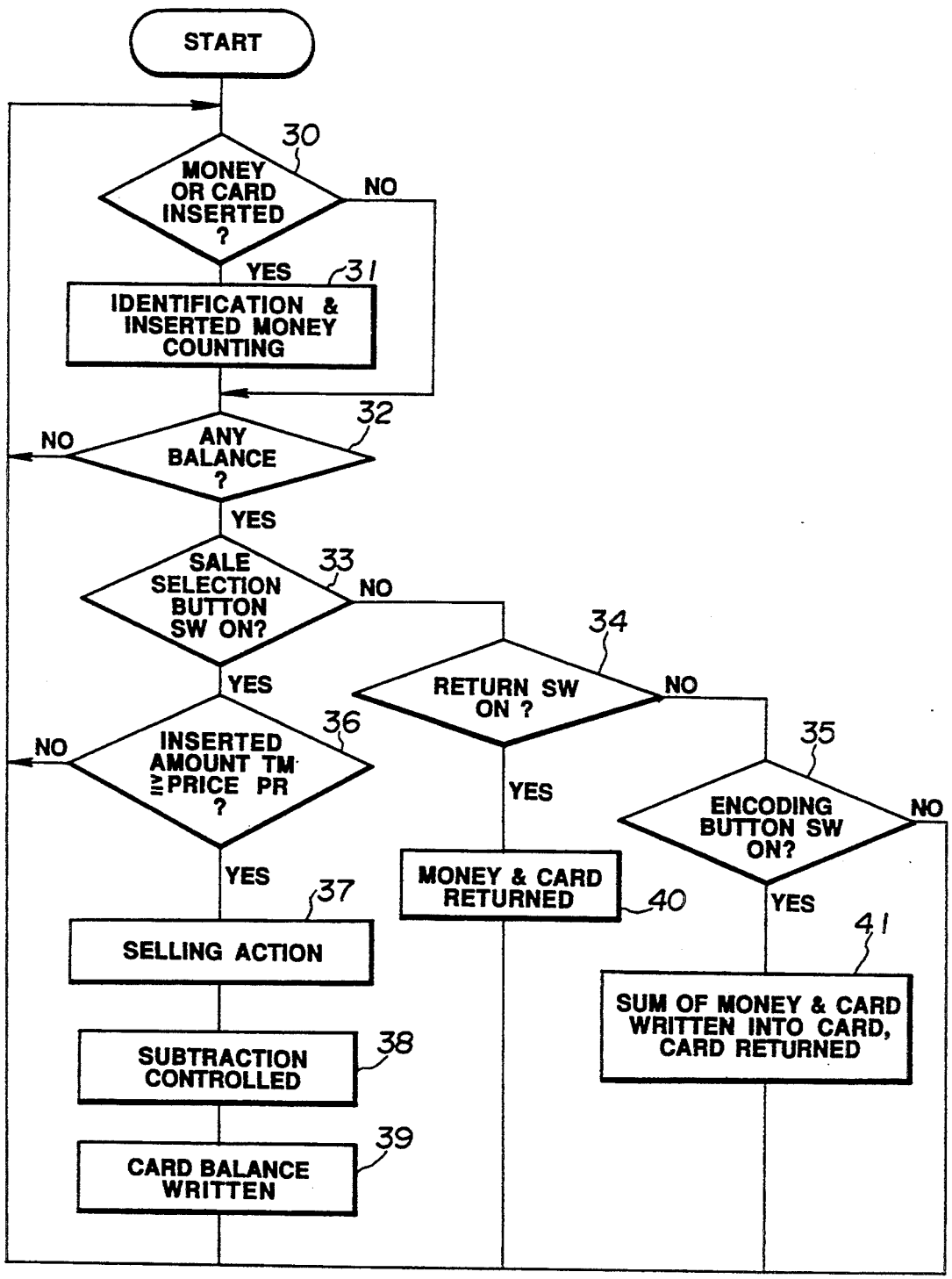
FIG. 3 is an example flowchart of processes in a case where functions similar to those shown in FIG. 2 are performed by a microcomputer.

Circuits corresponding to respective blocks shown in FIG. 2 may be substituted by discrete circuits or by a microcomputer that is capable of fulfilling the above described functions If the calculating and controlling sections shown in FIG. 2 are substituted by a microcomputer that fulfills the above described functions, an example of various processes performed by the microcomputer will be as shown in FIG. 3. The processes shown in FIG. 3 are concerned with the successive vending.

Referring to FIG. 3, first of all, it is examined in step 30 whether or not money or a card has been inserted. If the examination result is YES, the flow moves to step 31, in which the inserted money or card is identified. If the inserted money or card has been turned out to be acceptable, counting of the money amount or reading of the card amount is performed so that the inserted amount is obtained. If unacceptable, the money or card is returned. If the examination result in step 30 is NO, or after step 31 has been performed, step 32 is taken in which it is examined whether or not the sum TM of the inserted money and card amounts, namely, the balance of the inserted amount is other than zero. If there is no balance, the flow returns to step 30 and another insertion of money or a card is awaited. If there is balance, step 33 is taken.

In step 33, it is examined whether or not any of the product sale selection button switches 5a–5n has been actuated. If none of the switches 5a–5n has been actuated, the result in step 33 becomes NO, and then the flow advances to step 34 in which it is examined whether or not the return switch 7 has been actuated. If the return switch 7 has not been actuated, the flow advances to step 35 in which it is examined whether or not the encoding button switch 8 has been actuated. If the encoding button switch 8 has not been actuated, the flow returns to step 30. Thus, if there is any balance of the inserted money or card amount, the routine of steps 33, 34, 35 is repeated until any of the switches is actuated.

If any of the product sale selection button switches 5a–5n has been actuated, the result in step 33 becomes YES, and then the flow advances to step 36 in which it is examined whether or not the selling price PR of the selected product is equivalent to or less than the sum TM of the amounts of the inserted money and card. If the examination result is YES, step 37 is taken in which the selling action, namely, delivery of the selected product is done. If the examination result in step 37 is NO, the flow returns to step 30 in which additional insertion of money or a card is awaited. After step 37, such subtraction control is made in step 38 that the necessary amounts corresponding to the selling price are subtracted respectively from the inserted money and card amounts. This subtraction control corresponds to the control done by the subtraction controlling section 16 shown in FIG. 2. Next, in step 39, the balance of the card amount is written into the card. This card writing process corresponds to the control done by the first write-controlling section 17. Then, the flow returns to step 30.

When the return switch 7 has been actuated, the result in step 34 becomes YES, and then step 40 is taken for returning in cash the change corresponding to the inserted money amount and also the card. The processes in this step 40 corresponds to the control done by the return controlling section 19 shown in FIG. 2.

When the encoding button switch 8 has been actuated, the result in step 35 becomes YES, then step 41 is taken in which the sum of the inserted money amount and the current card amount is written into the card, and thence the card is returned. This process in step 41 corresponds to the control done by the second write-controlling section 18 shown in FIG. 2.

It is now to be noted that in the embodiment of FIG. 1, the card read/write mechanism 4 need not be separately provided if the money identifying machine 3 itself has a card read/write function.

Figure 4:
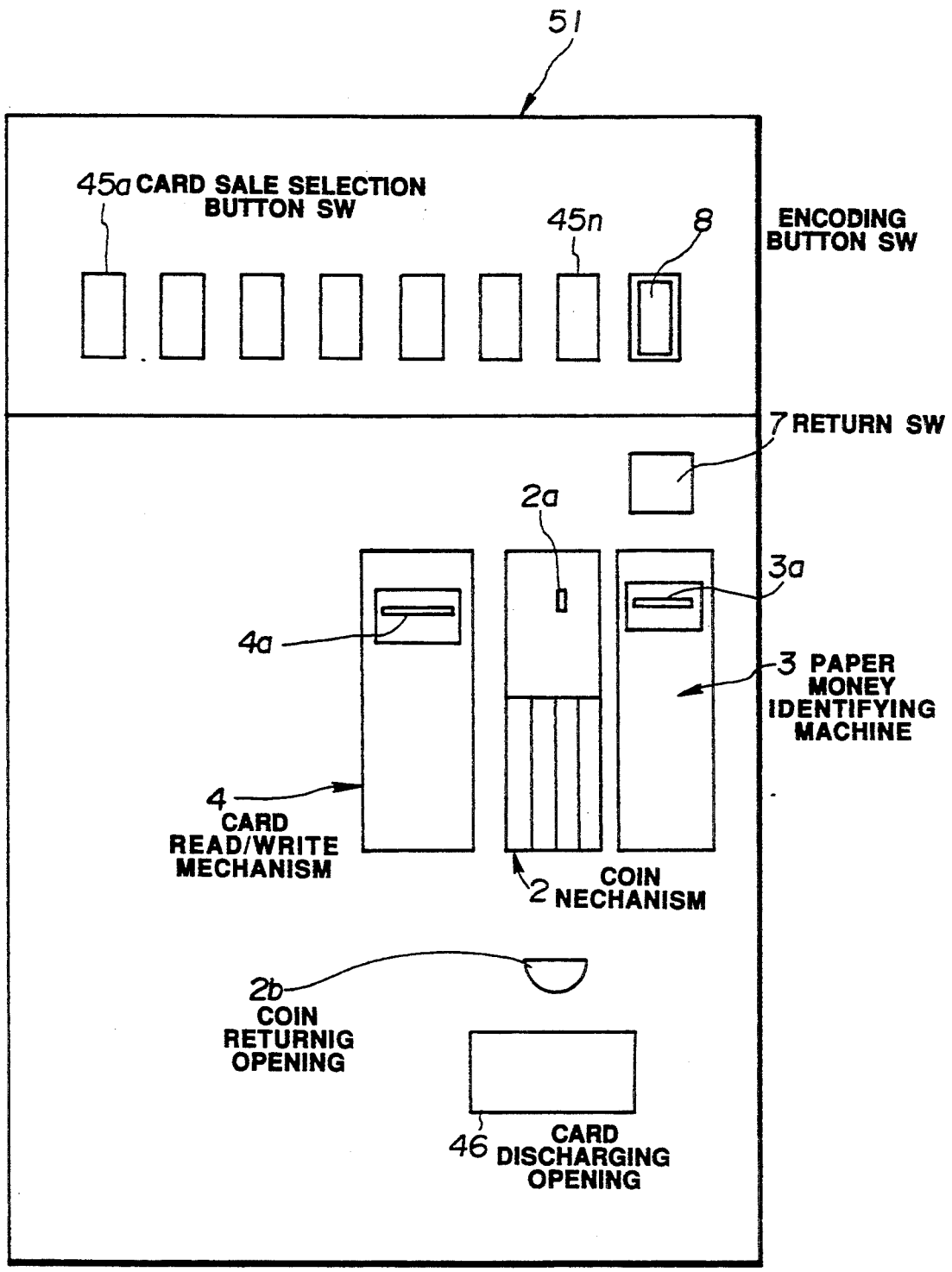
FIG. 4 is a front elevational view showing an embodiment of the invention used in a prepaid card vending machine.

Although the embodiment in FIG. 1 is a generally-known vending machine, a novel prepaid card vending machine can be provided by which the amount of an already issued card can be additionally renewed, if the present invention is embodied therein. FIG. 4 shows an embodiment of such machine.

In FIG. 4, 51 denotes a main body of the prepaid card vending machine, 2 denotes a coin mechanism, 2a a coin inserting slot, 2b a coin returning opening, 3 a money identifying machine, 3a a paper money inserting slot, 45a–45n card sale selection button switches, 46 a card discharging opening, and 7 a return switch. In this prepaid card vending machine, a card read/write mechanism 4 is newly provided along with an encoding button switch 8. 4a denotes a card inserting slot. In FIG. 4, elements indicated by the same reference numerals as in FIG. 1 have the same functions as those in FIG. 1. The card sale selection button switches 45a–45n are provided for selecting a prepaid card of a desired amount, a prepaid card of the selected amount being discharged through the card discharging opening 46.

Figure 5:
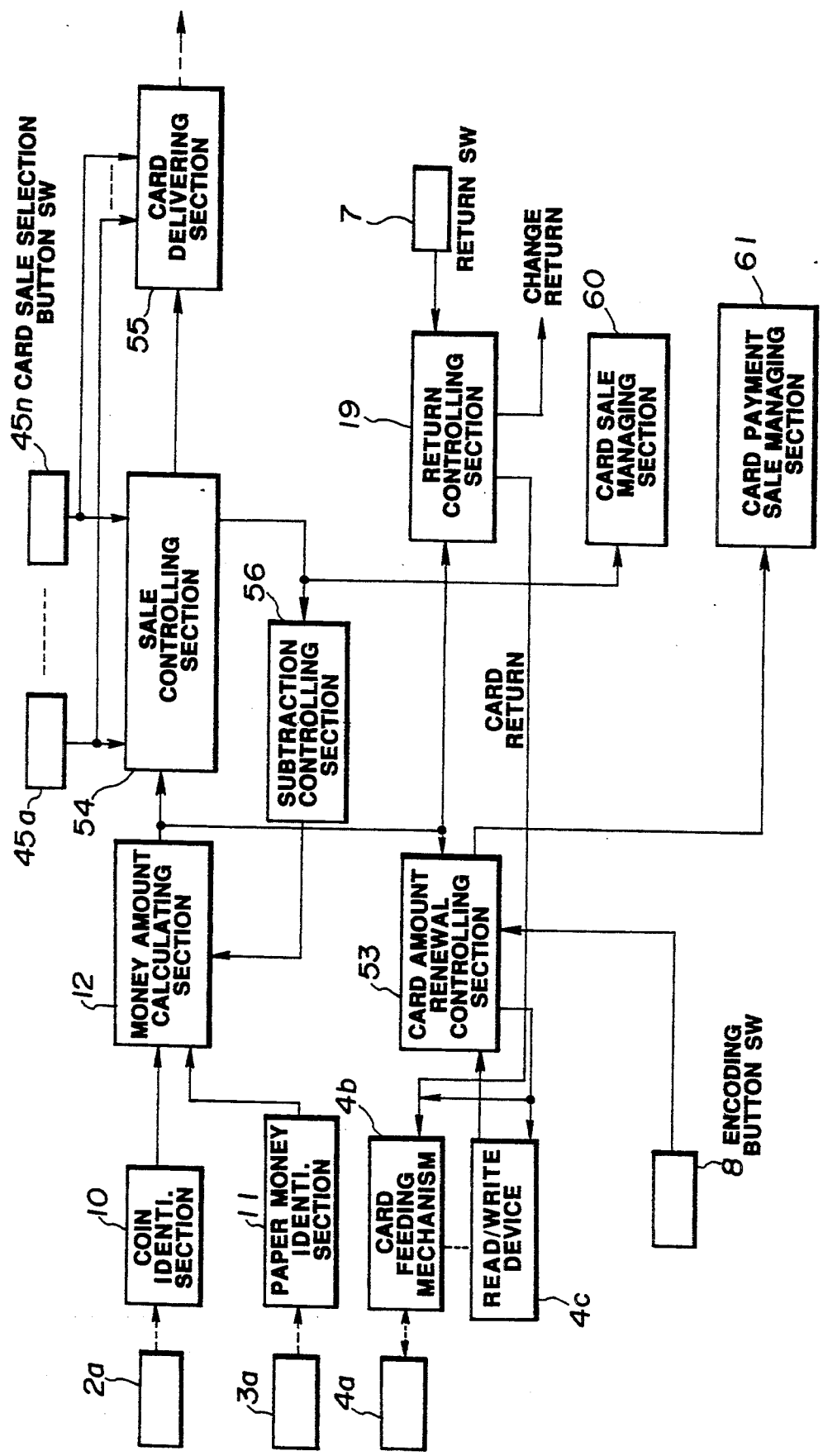
FIG. 5 is a block diagram schematically showing an example of a control-circuit section of the vending machine shown in FIG. 4.

FIG. 5 is a block diagram showing an example of the control-circuit portion of the prepaid card vending machine in FIG. 4. In FIG. 5, elements indicated by the same reference numerals as in FIG. 2 have the same functions as those in FIG. 2.

To describe points that are different from FIG. 2, a sale controlling section 54 determines whether or not a sale of a card selected by the actuation of any of the card sale selecting button switches 45a–45n is permissible within the limit of inserted money amount. If such sale is permissible, the sale controlling section 54 controls a card discharging section 55 to perform a selling action for the selected card. When the selling action has been performed, a subtraction controlling section 56 proceeds with control such that the amount equivalent to the selling price of the sold card is subtracted in the money amount calculating section 12.

A card amount renewal controlling section 53 inputs and temporarily stores amount information of a card read by a read/write device 4c and also inputs the outputs of the money amount calculating section 12 and encoding button switch 8. When the encoding button switch 8 has been actuated, the card amount renewal controlling section 53 calculates the sum of the temporarily stored card amount and the inserted money amount calculated by the money amount calculating section 12. Then, the controlling section 53 controls the read/write device 4c so that the sum is written into a card received by a card feeding mechanism 4c and subsequently controls the card feeding mechanism 4b so that the card is automatically returned.

Thus, when it is desired to additionally renew the amount of an already issued card, the card is inserted along with money of an amount to be added to the card, and the encoding button switch 8 is actuated, in response to which the sum of the current card amount and the inserted money amount is written into the card under the control of the card amount renewal controlling section 53.

Also in the example shown in FIG. 5, a card payment sale managing section 81 may be provided separately from a card sale managing section 60 which manages sales of cards newly issued in correspondence to the actuation of any of the card sale selection button switches 45a–45n, for cumulatively recording amounts added to the issued cards.

It is a matter of course that the processes done by the construction shown in FIG. 5 can also be done by a microcomputer.

Figure 6:
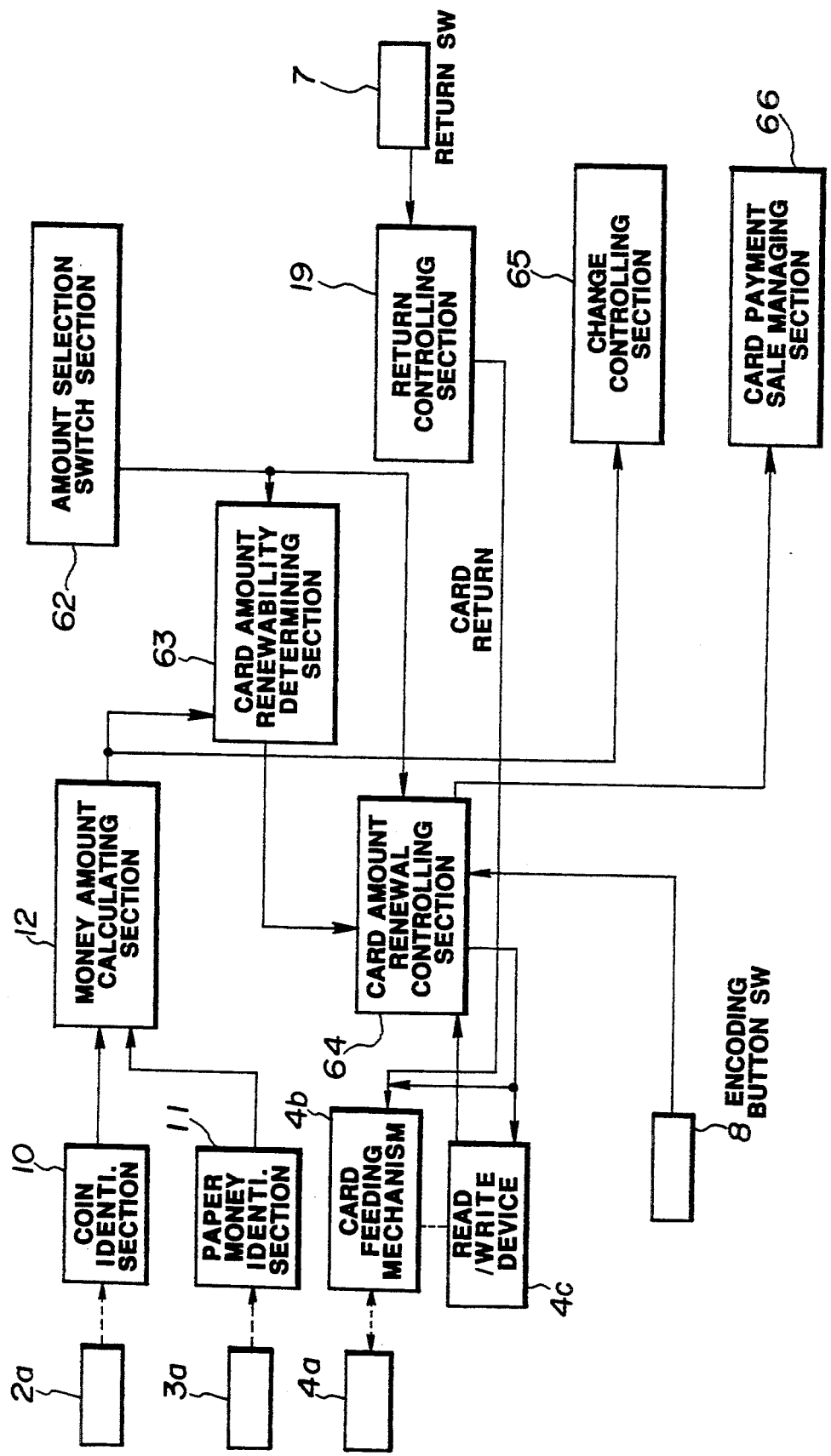
FIG. 6 is a block diagram schematically showing another example of the invention.

Although in each the above described embodiments, the entire inserted money amount is combined into a card, only a desired amount may be combined into the card with the remaining amount being returned in cash. For that purpose, an amount selection switches section 62 may be provided as shown in FIG. 6 so that an amount to be added to a card can be selected as desired. In FIG. 6, the same reference characters as in the other figures denote elements of the same functions.

A card amount renewability determining section 63 determines whether or not the amount selected by the amount selection switches section 62 is equivalent to or less than the inserted money amount calculated by a money amount calculating section 12. If the determination result is YES, the card amount renewability determining section 63 supplies to a card amount renewal controlling section 64 a signal indicating that the card amount is renewable.

The card amount renewal controlling section 64 inputs and temporarily stores amount information of the card read by a read/write device 4c, and calculates the sum of the temporarily stored amount and the amount selected by the amount selection switches section 62. Then, the controlling section 64 controls the read/write device 4c so that the device 4c writes the sum into a card received by a card feeding mechanism 4b and subsequently controls the card feeding section 4b so that the section 4b automatically returns the card.

When write-controlling has been made by the card amount renewability controlling section 64, a change controlling section 65 calculates the difference between the inserted money amount calculated by the money amount calculating section 12 and the amount selected by the amount selection switches section 62, and it then carries out control for returning the difference as the change.

Also in the example of FIG. 6, a card payment sale managing section 66 may be provided for cumulatively recording amounts added to the issued cards.

The construction shown in FIG. 6 can be combined with the construction shown in FIG. 2 or FIG. 4.

The amount selection switches section 62 may comprise a ten-key switch etc. for setting desired amount data, or may comprises a group of switches for selecting one of several preset amounts. Further, the amount selection switches section 62 may be used also as the product sale selection switches 5a–5n. In that case, the function of the switches may be shifted by a suitable manner such that the function of the product sale selecting switches 5a–5n, 45a–45n is shifted to the function as the amount selection switches section 82 when, for example, the encoding button switches 8 has been actuated.

Although not specifically shown, it is a matter of course that a display may be provided for displaying the inserted money or card amount.

As described above, according to the present invention, an amount of inserted money is written into a prepaid card in response to the actuation of an encoding button switches, namely, writing-instruction means. With this arrangement, there is achieved a superior advantageous result that an amount record in the prepaid card can be renewed as desired by the user, irrespective of whether or not a sale has been made. In addition, in an automatic vending machine for which cash and a card can be used in combination, the amount of an inserted money or its balance can be combined into the amount of a prepaid card or can be returned in cash, as desired by the user.

Moreover, according to the invention, there is also achieved a superior advantageous result that a desired amount can be selectively written into an already issued prepaid card.

Furthermore, according to the invention, there is achieved a superior advantageous result that in a prepaid card vending machine, it becomes possible to renew the amount record in an already issued card in correspondence to the insertion of money, in addition to selling a new prepaid card.

What is claimed is:

1. Vending system which comprises:
   money identifying means for identifying an inserted money;
   card receiving means for receiving a card in which amount information is recorded;
   card amount reading means for reading the amount information recorded in the card that is received by said card receiving means;
   money amount calculating means for counting an amount of the inserted money based on an output of said money identifying means and obtaining a balance of the inserted money by subtracting an amount corresponding to a selling price of a product;
   card amount calculating means for inputting the amount read by said card amount reading means and obtaining a balance of a card amount by subtracting an amount corresponding to a selling price of a product;
   write-instruction means including an operator for instructing for writing of amount information into the card when said operator has been operated;
   product sale selecting means for selecting a sale of a product;
   selling means for performing a selling action for a product when the product has been selected by said product sale selecting means;
   subtraction controlling means for, when the selling action has been performed, controlling said money amount calculating means and said card amount calculating means in such a manner that an amount equivalent to a selling price of a sold product is subtracted in at least one of said calculating means;
   return controlling means including a return selector for returning, when said return selector has been operated, an amount of money corresponding to a balance obtained by said money amount calculating means as a change, and then returning the card received by said card receiving means in an automatic fashion;

first write-controlling means for, when subtraction has been performed in said card amount calculating means under a control of said subtraction controlling means, automatically writing a balance thereof into the card received by said card receiving means; and second write-controlling means for, in response to instruction of said write-instruction means, writing a sum of outputs of said money amount calculating means and said card amount calculating means into the card received by said card receiving means and then returning the card in an automatic fashion.

2. A vending system as defined in claim 1, which further includes card payment sale managing means for recording data related to contents that is written into the card by said second write-controlling means.

3. A vending system as defined in claim 2, wherein said card payment sale managing means cumulatively records outputs of said money amount calculating means as card payment sales data.

4. A prepaid card vending system including a money device for identifying inserted money and calculating an amount of the inserted money, sale selecting means for selecting a sale of a card in which amount information is recorded, selling means for performing a selling action for a card selected by said sale selecting means, and subtraction controlling means for, when the selling action has been performed, effecting control to subtract a selling price of a sold card from the amount of the inserted money calculated by said money device, said prepaid card vending system comprising:

card receiving means for receiving a card in which amount information is recorded;

card amount reading means for reading the amount information received by said card receiving means;

amount selecting means for selecting an amount to be added to said card;

write-instruction means for instructing for writing of amount information into the card;

card amount writing means for, in response to instruction of said write-instruction means, writing a sum of the amount selected by said amount selecting means and an amount by said card reading means into the card and then returning the card;

controlling means for performing control to subtract the amount selected by said amount selecting means from the amount calculated by said money device to return an amount of money corresponding to a balance as a change; and card payment sale managing means for cumulatively recording data on the amount of the inserted money calculated by the money device among data written by said card amount writing means.

5. A vending system which comprises:

a money device for identifying inserted money and calculating an amount of the inserted money;

card receiving means for receiving a card in which amount information is recorded;

card amount reading means for reading the amount information recorded in the card that is received by said card receiving means;

amount selecting means for selecting an amount to be added to the card;

writing-instruction means for instructing for writing of amount information into the card;

card amount writing means for, in response to instruction of said writing-instruction means, writing a sum of the amount selected by said amount selecting means and an amount read by said card amount reading means into the card and then returning the card; and controlling means for performing control to subtract the amount selected by said amount selecting means from the amount calculated by said money device to return an amount of money corresponding to a balance as a change.

6. A vending system as defined in claim 5, which further includes card payment sale managing means for cumulatively recording data on the amount selected by said amount selecting means among data written by said card amount writing means.

* * * * *